(12) United States Patent
Meier et al.

(10) Patent No.: US 9,179,492 B2
(45) Date of Patent: Nov. 3, 2015

(54) ELECTRONIC DEVICE, METHOD AND SYSTEM FOR HALF DUPLEX DATA TRANSMISSION

(75) Inventors: Herbert Meier, Moosburg (DE); Andreas Hagl, Dachau (DE); Jim Childers, Missouri City, TX (US)

(73) Assignees: Texas Instruments Deutschland GmbH, Freising (DE); Texas Instruments Incorporated, Dallas, TX (US)

( * ) Notice: Subject to any disclaimer, the term of this patent is extended or adjusted under 35 U.S.C. 154(b) by 140 days.

(21) Appl. No.: 13/282,076

(22) Filed: Oct. 26, 2011

(65) Prior Publication Data

US 2013/0107762 A1    May 2, 2013

(51) Int. Cl.

| G05B 19/00 | (2006.01) |
| H04W 80/00 | (2009.01) |
| B60R 25/24 | (2013.01) |
| G06K 19/07 | (2006.01) |
| G06K 19/077 | (2006.01) |
| G07C 9/00 | (2006.01) |

(52) U.S. Cl.
CPC ............... H04W 80/00 (2013.01); B60R 25/24 (2013.01); G06K 19/0724 (2013.01); G06K 19/07792 (2013.01); G06K 19/0726 (2013.01); G07C 2009/00198 (2013.01)

(58) Field of Classification Search
CPC .......... G06K 19/0723; G06K 19/0724; G06K 19/0726; G06K 19/07792; G06K 19/07779; G06K 19/07783; G06K 19/07784
USPC ............................................. 340/572.5, 5.61
See application file for complete search history.

(56) References Cited

U.S. PATENT DOCUMENTS

| 5,260,701 A | * | 11/1993 | Guern et al. ................ 340/10.34 |
| 5,317,330 A | * | 5/1994 | Everett et al. ................. 343/867 |
| 5,347,280 A | * | 9/1994 | Schuermann .................... 342/42 |
| 5,600,335 A | * | 2/1997 | Abramo ......................... 343/749 |
| 5,608,417 A | * | 3/1997 | de Vall ........................... 343/895 |
| 5,808,550 A | * | 9/1998 | Raimbault et al. .......... 340/10.34 |
| 6,547,149 B1 | * | 4/2003 | Wuidart et al. ................ 235/492 |
| 7,167,080 B2 | * | 1/2007 | Waters .......................... 340/10.4 |
| 7,528,725 B2 | * | 5/2009 | Stewart ....................... 340/572.5 |
| 2005/0231439 A1 | * | 10/2005 | Suwa et al. .................... 343/876 |
| 2005/0237163 A1 | * | 10/2005 | Lee et al. .................... 340/10.51 |
| 2006/0220786 A1 | * | 10/2006 | Hagl et al. .................... 340/5.61 |
| 2008/0224935 A1 | * | 9/2008 | Kato ............................. 343/749 |
| 2009/0135079 A1 | * | 5/2009 | Dokai et al. ................... 343/850 |
| 2009/0153300 A1 | * | 6/2009 | Meier .......................... 340/10.1 |

(Continued)

*Primary Examiner* — John A Tweel, Jr.
*Assistant Examiner* — Adnan Aziz
(74) *Attorney, Agent, or Firm* — William B. Kempler; Frank D. Cimino

(57) ABSTRACT

An electronic device and method for half duplex data transmission in a long range keyless entry and go system, and more specifically to an RFID transponder, a corresponding read/write (R/W) unit and methods for operating the RFID transponder and the R/W-unit. There is a first coil, a second coil and a third coil, being arranged as a three-dimensional antenna, a first capacitor, a second capacitor and a third capacitor couplable in parallel to the first coil, the second coil and the third coil, respectively, for selectively forming a first, a second and a third parallel-resonant circuit for receiving radio signals, a series-resonant circuit for transmitting radio signals and a control stage configured to either use one of the first, second or third parallel-resonant circuits for receiving radio signals or the series-resonant circuit for transmitting signals.

20 Claims, 8 Drawing Sheets

(56) References Cited

U.S. PATENT DOCUMENTS

| | | | |
|---|---|---|---|
| 2009/0166434 A1* | 7/2009 | Taniguchi et al. | 235/492 |
| 2010/0068998 A1* | 3/2010 | Zyambo et al. | 455/41.1 |
| 2010/0123556 A1* | 5/2010 | Rofougaran et al. | 340/10.1 |
| 2010/0290368 A1* | 11/2010 | Meier et al. | 370/278 |
| 2011/0140863 A1* | 6/2011 | Shingai | 340/10.6 |
| 2011/0165849 A1* | 7/2011 | Gorbachov | 455/84 |
| 2011/0187615 A1* | 8/2011 | Sakata et al. | 343/722 |
| 2011/0254749 A1* | 10/2011 | Amari et al. | 343/750 |
| 2011/0266882 A1* | 11/2011 | Yamamoto et al. | 307/104 |
| 2012/0119884 A1* | 5/2012 | Nehrig et al. | 340/10.4 |
| 2012/0161935 A1* | 6/2012 | Ziegler | 340/10.1 |
| 2013/0017781 A1* | 1/2013 | Jones | 455/41.1 |

* cited by examiner

ELECTRONIC DEVICE, METHOD AND SYSTEM FOR HALF DUPLEX DATA TRANSMISSION

FIELD OF THE INVENTION

The invention relates to an electronic device and method for a long range keyless entry and go system, and more specifically to an RFID transponder, a corresponding read/write (R/W) unit and methods for operating the RFID transponder and the R/W-unit.

BACKGROUND OF THE INVENTION

RFID systems include RFID transponders and read/write units (R/W-unit) for writing data to the RFID transponder (downlink) or for reading data from a RFID transponder (uplink). The RFID transponder front end has a high quality inductor, which is used as antenna and a resonant capacitor coupled to the antenna. The inductive antenna and the resonant capacitor form a parallel-resonant circuit, which is excited by an external RF signal from the R/W-unit during downlink. For passive RFID transponders, the received RF signal is rectified and converted into an internal supply voltage for supplying the RFID transponder. The downlink data transmission is typically performed by a 100% amplitude shift keying modulation. According to this modulation, the R/W-unit sends bursts of RF signals and the RFID transponder determines based on the length of the bursts and pauses between the bursts the data to be received. For uplink data transmission, many RFID transponders use frequency shift keying (FSK), for example 134.3 kHz for a low bit and 123.2 kHz for a high bit.

Transponders with only one antenna are sensitive to orientation. Therefore, advanced transponders are provided with three antennas in the form of three LC resonant circuits which are arranged in a three-dimensional configuration. The three antenna circuits have antenna structures that are physically oriented at mutually 90 degrees. With such a transponder, signals from a transceiver/interrogator placed, for example, in a vehicle are detected independently of orientation in space of the transponder.

FIG. 1 shows an RFID system comprising an R/W-unit also referred to as interrogator 10 which in the case of a passive entry system may be located in a vehicle. The interrogator comprises for example a control unit 10a, an LF transceiver 10b and a UHF receiver 10c. The RFID system further comprises an identification device or key or transponder 12 comprising for example a microcontroller or control logic 12a and probably additionally a UHF unit 12b for sending a UHF signal, and a front-end circuit 14 connected to three LC resonant circuits 16, 18 and 20, which are arranged in a three-dimensional configuration. The UHF transmitter operates at a frequency of about 315 MHz, 434 MHz or 868 MHz. Arrows 22 indicate that the LF transceiver 10b will send an interrogation signal (wake up signal and challenge) to all three LC resonant circuits during an interrogation interval. The interrogation interval is at the same time a capacitor charging phase, as at least one storage capacitor comprised in the transponder will be charged to supply the transponder with energy during the response interval. According to the orientation in space of transponder 12 in relation to interrogator unit 10, one LC resonant circuit will receive the interrogation signal best and the associated receiver channel will be selected. Only the LC resonant circuit which is associated to the selected receiver channel will send a response signal. In FIG. 1 this is LC resonant circuit 16 and the response signal is indicated by an arrow 24. Although FIG. 1 shows both directions for signal transmission, it is to be understood that in a half-duplex transponder receiving and transmitting are separated in time, transponder 12 first receives an interrogator signal 22 and afterwards sends a response 24.

In a keyless entry and keyless go system the low frequency (for example 134.2 kHz) transmission is used for waking and challenging the battery supplied key over a distance of typically several meters. The key uses the UHF transmitter for responding to the R/W-unit (uplink). Some keyless entry and keyless go systems do not require a distance of several meters. For those systems, the configuration shown in FIG. 1 and described hereinabove is too expensive and too complex.

SUMMARY OF THE INVENTION

It is a general object of the invention to provide a keyless entry and keyless go system, an electronic device and methods for a long range keyless entry and go system that are less expensive and less complex but still have sufficient range in the uplink direction.

In an aspect of the invention, an electronic device for half-duplex transmission of radio signals is provided. The electronic device may be an integrated circuit, it may comprise several integrated circuits and other electronic components (coils, capacitors etc). The electronic device may in particular be a transponder that can be arranged in a device replacing a key (for example for vehicle like a motor bike or a car). The electronic device can then comprise a first coil, a second coil and a third coil, which are arranged as a three-dimensional antenna. There is a first capacitor, a second capacitor and a third capacitor which are coupled in parallel to the first coil, the second coil and the third coil, respectively. The three coils and the three capacitors form a first, a second and a third parallel-resonant circuit each of which is configured to receive and transmit radio signals. The first, second and third parallel resonant circuits advantageously can receive and transmit radio signals without a battery. They may be used for short distances, like for example a few centimeters, as required for example for immobilizers of a vehicle. Furthermore, there is a series-resonant circuit for transmitting radio signals and a control stage configured to either use one of the first, second or third parallel-resonant circuits for receiving radio signals and to use the series-resonant circuit for transmitting signals. The series-resonant circuit is advantageously configured to transmit the radio signals in the same frequency range as the parallel-resonant circuits. This aspect of the invention provides that the transmission range is extended as the voltage drop across the coil in a series-resonant circuit is greater than the voltage drop across the coil in a parallel-resonant circuit.

In an embodiment of the invention, the parallel-resonant circuits can be configured to receive signals at a first frequency (resonant frequency) and the series-resonant circuit is configured to transmit the radio signals at the first frequency and a second frequency that is different from the first frequency in accordance with a frequency shift keying (FSK) principle. This provides optimum performance during transmission.

In an embodiment, there can be a fourth capacitor which is coupled with the first side to a first side of the first coil for selectively forming the series-resonant circuit and for transmitting the radio signals through the first coil. The control stage may then be configured to switch from parallel resonance to serial resonance using either the first or the second FSK frequency (for example 134.2 kHz or 123.2 kHz) in order to drive a greater current through the first coil.

The control stage can then be configured to selectively couple either the first capacitor in parallel to the first coil for receiving the radio signals or to couple the fourth capacitor in series to the first coil for transmitting the radio signals.

There can further be a fifth capacitor which is coupled with a first side to a first side of the second coil for selectively forming the series-resonant circuit and for transmitting the radio signals through the second coil and the control stage can be configured to switch from parallel resonance to serial resonance using either the first or the second FSK frequency (for example 134.2 kHz or 123.2 kHz) in order to drive a greater current through the second coil.

The control stage can then be configured to selectively couple either the second capacitor in parallel to the second coil for receiving the radio signals or to couple the fifth capacitor in series to the second coil for transmitting the radio signals.

In another embodiment, a sixth capacitor may be coupled with a first side to a first side of the third coil for selectively forming the series-resonant circuit and for transmitting the radio signals through the third coil and the control stage may then be configured to switch from parallel resonance to serial resonance using either the first or the second FSK frequency (for example 134.2 kHz or 123.2 kHz) in order to drive a greater current through the third coil. The control stage can then be configured to selectively couple either the third capacitor in parallel to the third coil for receiving the radio signals or to couple the sixth capacitor in series to the third coil for transmitting the radio signals.

There may also be a seventh capacitor which can then be coupled with a first side to the first coil and with a second side to a first side of a switch that is coupled with a second side to a supply voltage level, in particular to ground. The switch can then be controlled so as to selectively change the resonant frequency of the series-resonant circuit by connecting the second side of the seventh capacitor through the switch to ground. The series-resonant circuit comprises the first coil and the fourth capacitor, the resonant frequency of which is changed during transmission of the radio signals for frequency shift keying of the radio signals.

In an aspect of the invention, there may be similar transistors, as the seventh transistor, for the other two series-resonant circuits. These transistors may be switch simultaneously and similar to the seventh transistor.

In another aspect of the invention, only one of three series-resonant circuits may be used for transmission. The one series-resonant circuit that is used, may be the one that corresponds to the direction or orientation having the best RSSI (Received Signal Strength Indication) during reception. The control stage may then be configured to determine the RSSI of the three parallel-resonant circuits during reception. This may then be used to select the best series-resonant circuit for transmission.

In an aspect of the invention, only the series-resonant circuit having the best corresponding RSSI value can be excited to oscillate. The remaining series-resonant circuits may not oscillate. However, the transistors for shifting the frequency of the series-resonant circuits may still be switched, also for the series-resonant circuits that do not oscillate.

The electronic device can further comprise a first normally closed (connecting) switch or relay (for example a semiconductor relay; also referred to as form B-type). The normally closed switch is advantageously a semiconductor device, as for example a MOSFET relay. The term "normally closed" means that switch is connecting (closed) even without power. The first normally closed switch can then be coupled between the first side of the first coil and a first side of the first capacitor so which can selectively decouple the first side of the first coil from the first side of the first capacitor. This provides that the parallel-resonant circuit can operate even without a battery or other independent power source. The electronic device may then always be used, for example for immobilizing a vehicle over a short distance of a few centimeters. The long range transmission through the series-resonant circuit may be used if an independent power source is present.

There may be a second normally closed switch that is coupled between the first side of the second coil and a first side of the second capacitor which can selectively decouple the first side second coil from the first side of the second capacitor.

There can further be a third normally closed switch that is coupled between the first side of the third coil and a first side of the third capacitor which can selectively decouple the first side of the third coil from the first side of the third capacitor.

In an embodiment of the invention, the first, second and/or third normally closed switches may be a first MOSFET relay that is coupled between the first side of the first coil and a first side of the capacitor, a second MOSFET relay that is coupled between the first side of the second coil and a first side of the second capacitor and a third MOSFET relay that is coupled between the first side of the third coil and a first side of the third capacitor which can selectively decouple the first sides of the first second and/or third coil from the first sides of the first, second and/or third capacitor. This means that the MOSFET relays usually provide an electrical connection unless they are switched off. This is particularly useful to ensure that the MOSFET relays provide the electrical connection even if the voltage supply level is zero or insufficient. This situation can typically occur in passive transponders. The MOSFET relays can further have a galvanic isolated control input. The second sides of the first, second and third coil can be coupled together at one node. The second sides of the first, second and/or third capacitor can also be coupled together at one node.

In another embodiment of the invention, the series-resonant circuit can generally comprise a coil and a capacitor. The capacitor can then be coupled with the first side to a first side of the coil and with a second side to a switching stage that is configured to selectively couple the second side of the capacitor to a first supply voltage node having a first supply voltage level or a second supply voltage node having a second supply voltage level. The second supply voltage level can be ground. This mechanism can be used to generate an oscillation of the series-resonant circuit. The frequency of the oscillation is the resonant frequency. The resonant frequency can advantageously be the first frequency, which is also the resonant frequency of either one of the parallel-resonant circuits.

The switching stage may then comprise a first transistor that is coupled with a first side of its channel to the second side of the capacitor and with a second side of its channel to the first supply voltage node. There can also be a second transistor that is coupled with a first side of its channel to the second side of the capacitor and with a second side of its channel to the second supply voltage node, so as to alternately and selectively switch the second side of the capacitor between the first supply voltage level and the second supply level.

The electronic device may further comprise another capacitor that is coupled with a first side to the first side of the coil and with a second side to a switch for selectively coupling the second side of the capacitor to the second supply voltage level. The second supply voltage level can be ground.

The transistors of the switching stage can be bipolar transistor. The switch can also be a bipolar transistor. The transistors can also be MOSFETs. The switch can also be a MOSFET.

The invention also provides a system comprising the electronic device, for example as a transponder according to the aspects and embodiments of the invention and an R/W-unit which is then configured to receive the radio signals transmitted from the electronic device.

The invention also provides a method for half-duplex transmission of radio signals. A parallel-resonant circuit is then used for receiving radio signals and a series-resonant circuit is used for transmitting radio signals. The series-resonant circuit can be used for uplink data transmission and the parallel-resonant circuit for downlink data transmission. The series-resonant circuit and parallel-resonant circuit are preferably arranged within the same electronic device, in particular a transponder. The transmission of the radio signals is performed according to a frequency shift keying principle.

BRIEF DESCRIPTION OF DRAWINGS

Further aspects of the invention will appear from the appending claims and from the following detailed description given with reference to the appending drawings.

DETAILED DESCRIPTION OF EXAMPLE EMBODIMENTS

Figure 2:
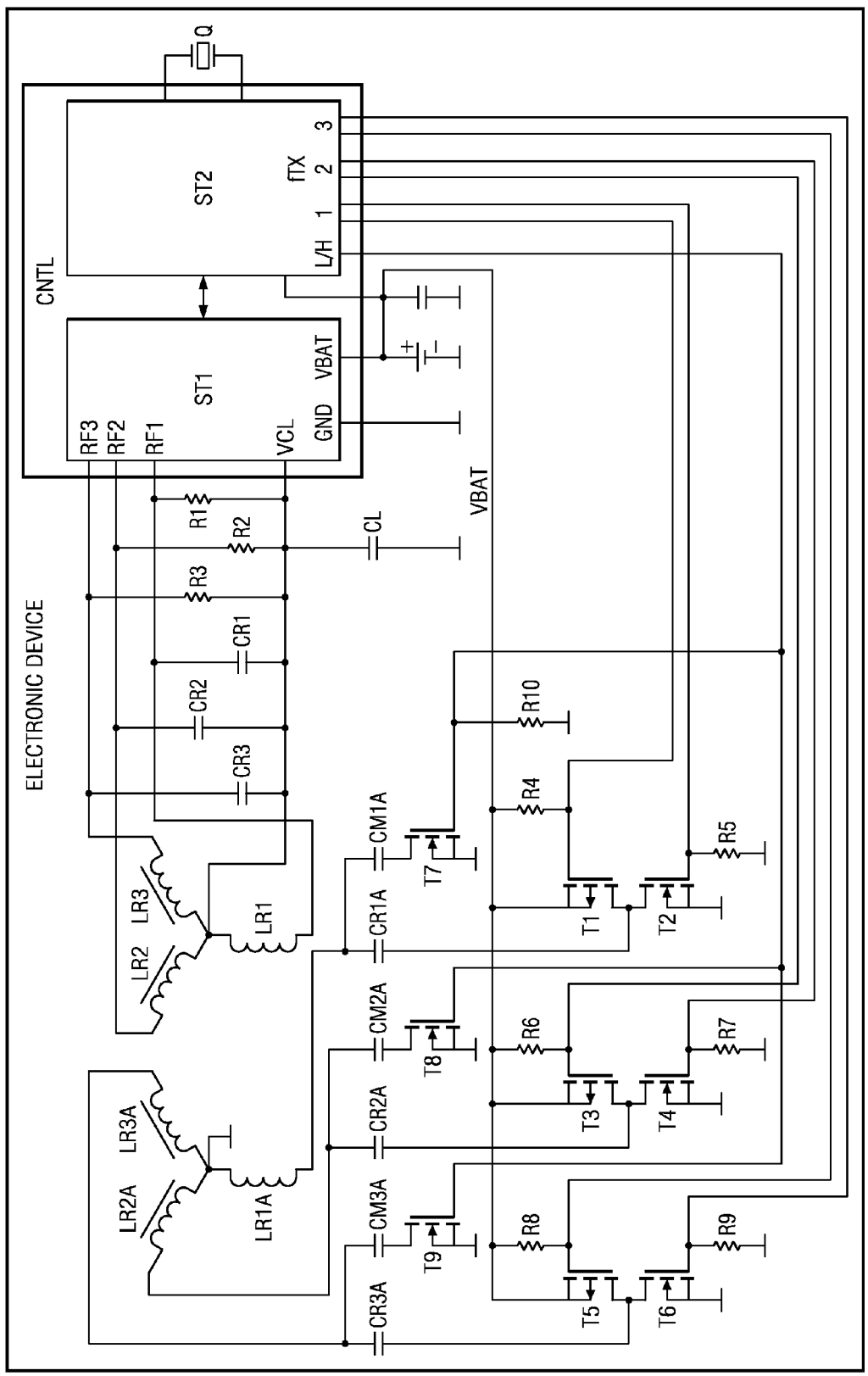
FIG. 2 shows a simplified circuit diagram of an electronic device according to a first embodiment of the invention.

FIG. 2 shows a simplified circuit diagram of a first embodiment of the invention. There is an electronic device, parts of which can be integrated circuits. The electronic device can be a transponder, for example in a substitute for a conventional key for a keyless entry and go system. The electronic device comprises a control stage CNTL. The control stage CNTL comprises a first stage ST1 and a second stage ST2. The first stage ST1 is a front-end comprising various stages for receiving amplifying limiting and/or demodulating the received signals. The second stage ST2 is typically a microcontroller. The first stage ST1 and the second stage can be coupled through a serial bus, for example through an SPI (serial programmable interface). The microcontroller is also coupled to a crystal oscillator Q. The first stage ST1 is coupled to three parallel-resonant circuits. The first parallel-resonant circuit comprises capacitor CR1 and coil LR1. The second parallel-resonant circuit comprises capacitor CR2 and coil LR2 and the third parallel-resonant circuit comprises capacitor CR3 and coil LR3. The coils LR1, LR2 and LR3 serve as antennas. The antennas are configured as a three-dimensional antenna. This means each of the antennas is arranged perpendicular with respect to the two other antennas. The radio signals are received by one of the three parallel-resonant circuits CR1, LR1; CR2, LR2; CR3, LR3 and fed to respective inputs RF1, RF2 and RF3 of the front-end ST1. The front-end ST1 is configured to determine the RSSI for each coil LR1, LR2 or LR3. The result can be used in order to select parallel-resonant circuit out of the three parallel-resonant circuits having the highest signal strength. There is further a buffer capacitor CL that is coupled between the voltage node VCL and ground (second supply voltage node). The front-end ST1 receives the first supply voltage VBAT either from a battery for supplying amplifiers, wake pattern detectors and microcontrollers or, in case of close distance from the received radio signals which are rectified. The second alternative can be used for supplying circuitry for passive immobilizer functions.

There are also resistors R1, R2 and R3 which are coupled in parallel to the capacitors CR1, CR2 and CR3 respectively for reducing the quality factor of the parallel-resonant circuits. This accelerates the data transmission during downlink and secures functionality in case of a broken antenna wire. There is a second three-dimensional antenna comprising coils LR1A, LR2A and LR3A. These coils are also arranged in a three-dimensional configuration in which each of the antennas is perpendicular with respect to the other antennas/coils. Each of the coils LR1A, LR2A and LR3A forms part of a series-resonant circuit. Accordingly, CR1A and LR1A are coupled together at respective first sides in order to form a series-resonant circuit. LR2A and CR2A are coupled together at respective first sides in order to form a second series-resonant circuit. LR3A and CR3A are coupled together at respective first sides in order to form a third series-resonant circuit. The second side of coil LR1A is coupled together with the second side of coil LR2A and the second side of coil LR3A. The second sides of the coils LR1A, LR2A and LR3A are coupled to ground. The second side of capacitor CR1A is coupled between a transistor T1 and a transistor T2. Transistor T1 is configured to couple the second side of capacitor CR1A to the first supply voltage level VBAT. The second transistor is configured to couple the second side of the capacitor CR1A to ground. Transistors T1 and T2 form a switching stage. Corresponding switching stages are formed by transistors T3 and T4 for capacitor CR2A and transistors T5 and T6 for capacitor CR3A. Transistors T1, T3 and T5 are coupled with their control gates to pull-up resistors R4, R6 and R8 respectively. The transistor T2, T4 and T6 are coupled with their control gates to pull-down resistor R5, R7 and R9 which are coupled to ground. Furthermore, the control gates of transistors T1, T2, T3, T4, T5 and T6 are coupled to output ports of the control stage CNTL. A further pull-down resistor R10 is coupled to the control gates of transistors T7, T8 and T9.

The switching stages comprising transistors T1 to T6 are configured to generate an oscillation of the three series-resonant circuits CR1A, LR1A, CR2A, LR3A, and CR3A respectively, by switching the respective second sides of capacitors CR1A, CR2A and CR3A between VBAT and ground. The switching is performed by the second stage ST2 that uses the clock signal from the crystal oscillator Q as a reference.

In order to support a frequency shift keying, there are further capacitor CM1A, CM2A and CM3A which can selectively be switched to the respective series-resonant circuit in order to change the resonant frequency. Capacitor CM1A is coupled with its first side to the first side of capacitor CR1A. The second side of capacitor CM1A is coupled to a channel of transistor T7 that serves as a switch. Transistor T7 is coupled with the other side of its channel to ground. If transistor T7 is turned on, the frequency of the resonant circuit LR1A, CR1A is changed by a predefined amount. The same operation can be performed by transistors T8 and capacitor CM2A as well as by transistor T9 and capacitor CM3A for the respective other two series-resonant circuits. Simultaneous activation of all three capacitors CM1A, CM2A and CM3A (i.e. transistors T7, T8 and T9 are turned on (connecting)) is possible. Only one of the three resonance circuits is then driven by an output signal form stage ST2 and the others are in a high-impedance state.

The control stage CNTL, and more specifically the second stage ST2 (for example a microcontroller) provides output ports L/H fTX1, fTX2 and fTX3. The output port L/H is used to generate the frequency shift. This means that the output port L/H is coupled to the control gates of transistors T7, T8 and T9 in order to switch the transistors on and off. The output ports fTX1, fTX2, fTX3 are coupled to the control gates of T1 and T2 (fTX1), the control gates of transistors T3 and T4 (fTX2) and the control gates of transistors T5 and T6 (fTX3), respectively. Through these transistors (switching stages) the respective second sides of capacitors CR1A, CR2A and CR3A are alternately coupled to VBAT or to ground. This provides that the series-resonant circuits oscillate at either the first FSK frequency or the second FSK frequency. The first frequency may be 134.2 kHz and the second FSK frequency can be 123.2 kHz. The amplitudes of the transmitted signals are at the highest level if the magnitude of the currents through the coils are at maximum. This is the case, if the quality factor of the series-resonant circuits is high and the resonance frequency of the series-resonant circuits is equal to the FSK frequency. Therefore, the embodiments of the invention operate with maximum currents through coils, as T7, T8 and T9 switch the resonance frequency of the series-resonant circuits, which can be referred to as resonance circuit switching. The outputs fTX1, fTX2 and/or fTX3 which are not used are inactive and switched into a high impedance state. The unused driver transistors T1, to T6 are then also turned of due to pull-up and pull-down resistors R4, R5, R6, R7, R8 and R9.

Figure 3:
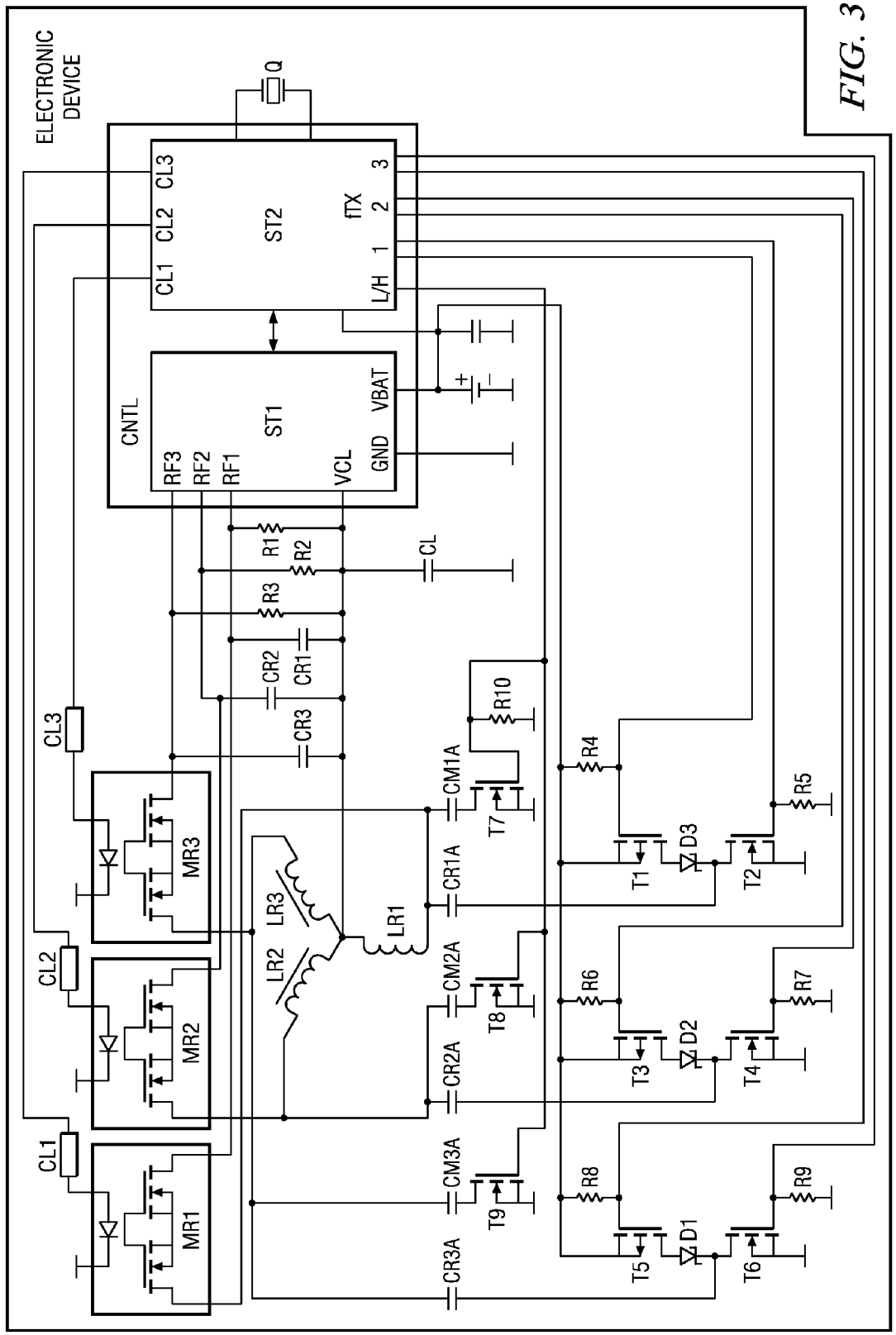
FIG. 3 shows a simplified circuit diagram of a second embodiment of the invention.

FIG. 3 shows a simplified circuit diagram of another embodiment of the invention. This embodiment uses only a single three-dimensional antenna for receiving and for transmitting radio signals. The first side of coil LR1 is now coupled to a first side of a first MOSFET relay MR1 (normally closed switch). The second side of the MOSFET relay MR1 is coupled to one side of capacitor CR1. This MOSFET relay is usually turned on (connecting). This means that even without or with only low supply voltage from a power source like battery (VBAT), LR1 and CR1 are already or still configured as a parallel-resonant circuit. The same configuration is used for LR2 and CR2 as well as LR3 and CR3. This means that the first side of coil LR2 is coupled to a first side of MOSFET relay MR2. The second side of MOSFET relay MR2 is coupled to a first side of CR2. Furthermore, the first side of coil LR3 is coupled to a first side of MOSFET relay MR3. The second side of MOSFET relay MR3 is coupled to a first side of capacitor CR3. This means that without any control signals CL1, CL2 or CL3 provided by the control stage CNTL (more specifically by the second stage ST2, for example a microcontroller) there are three parallel-resonant circuits for receiving radio signals, for example from an interrogator (R/W-unit). For transmitting radio signals, the MOSFET relays MR1, MR2 and MR3 are switched off (disconnecting). In this configuration, the three coils LR1, LR2 and LR3 operate together with respective capacitors CR1A, CR2A and CR3A as series-resonant circuits, as previously described. Due to the MOSFET relays MR1, MR2 and MR3 (three normally closed switches), the parallel-resonant circuits can operate even without a battery or another separate power supply. The electronic device can be powered through radio signals and transmit through the parallel-resonant circuits. The distance for this transmission is rather short, typically in the range of a few centimeters. However, this can be used for an immobilizer function of a vehicle. This function is then always provided. In addition to the immobilizer function, the electronic device can transmit over a long range using a series-resonant circuit, if a battery or an accumulator is used. The three normally closed MOSFET relays are then opened (disconnecting).

Figure 1:
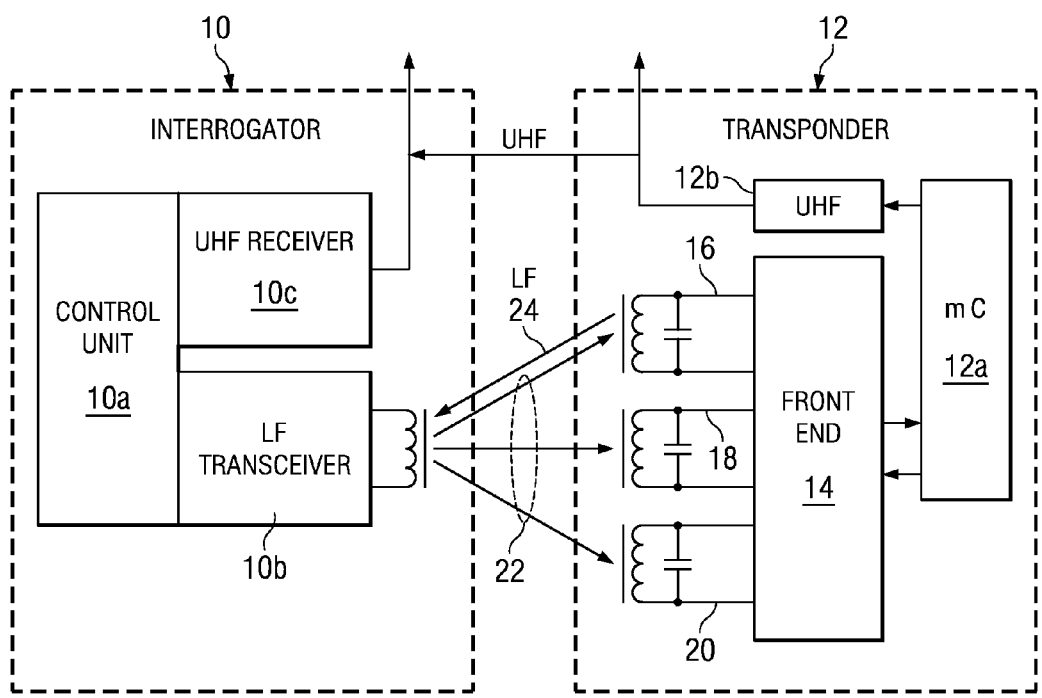
FIG. 1 shows a simplified schematic and block diagram of a system for half-duplex data transmission according to the prior art.

Another optional difference with respect to the embodiment shown in FIG. 1 is that three diodes D1, D2 and D3 are provided in the switching stages. Accordingly, a first diode D1 is coupled with an anode to one side of the channel of transistor T5 with a cathode to one side of the channel of T6. In other words, diode D1 is coupled between the channels of transistor T5 and T6. Diode D2 is coupled in forward direction between the channels of transistor T3 and T4 and diode D3 is coupled in forward direction between the channels of transistor T1 and T2. Between the cathode of diode D1 and the channel of transistor T6, the second side of capacitor CR3A is coupled. The second side of capacitor CR2A is coupled between the cathode of diode D2 and one side of the channel of transistor T4. The second side of capacitor CR1A is coupled between the cathode of diode D3 and the channel of transistor T2. The diodes D1 to D3 are preferably Schottky diodes in order to keep the voltage drop across the diodes small. The diodes D1 to D3 reduce the maximum currents through the coils of the series resonant circuits. However, the diodes D1 to D3 prevent that a parasitic radio frequency current flows from parallel resonant circuit via CR1A (CR2A, CR3A) and T1 (T3, T5) to VBAT. This provides a higher charge voltage and a higher passive reading distance.

The control stage CNTL can now be configured to select the coil for transmission out of coils LR1, LR2 and LR3 that had the best RSSI during reception of the radio signals.

Figure 4:
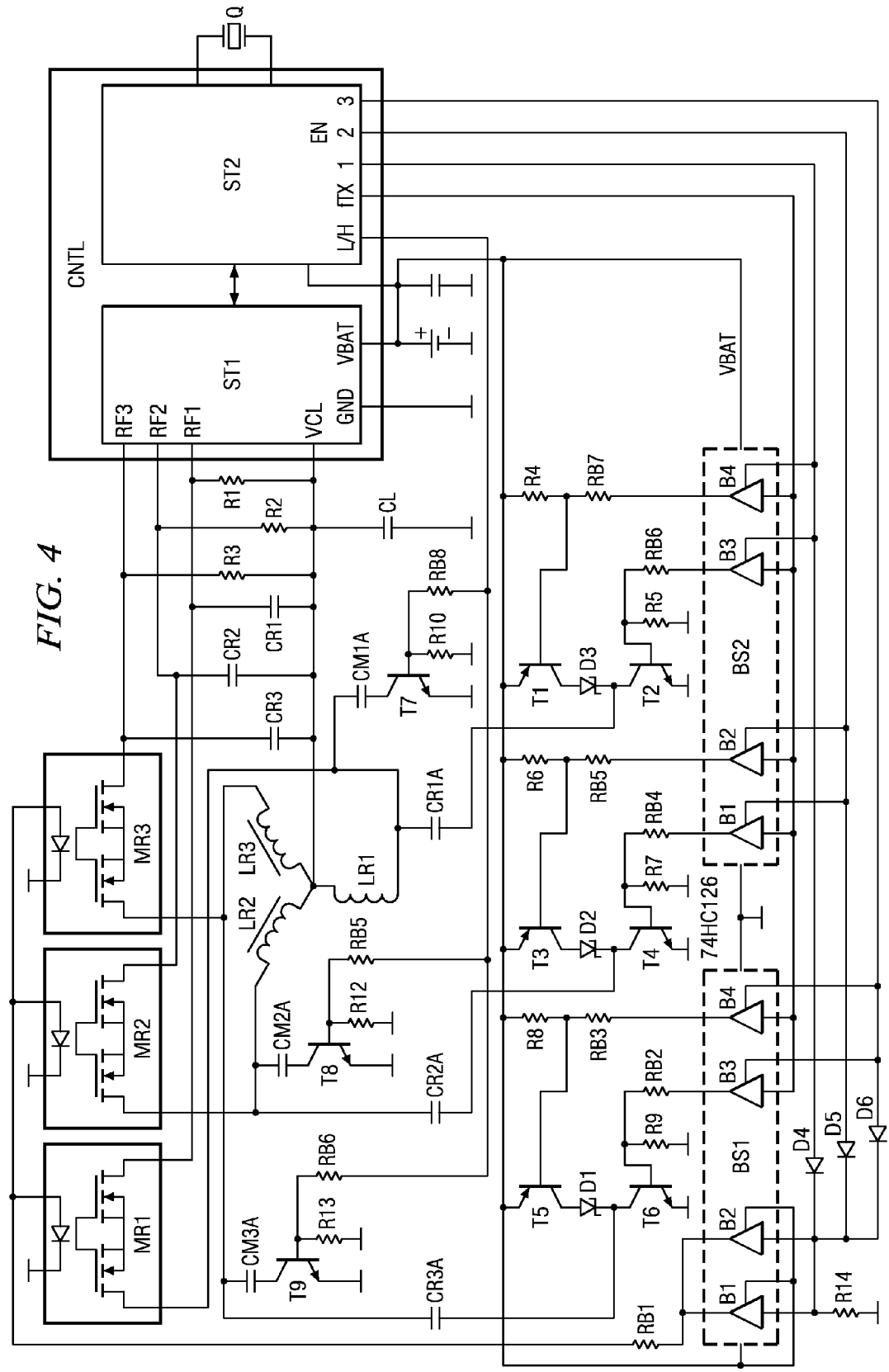
FIG. 4 shows a simplified circuit diagram of a third embodiment of the invention.

FIG. 4 shows a simplified circuit diagram of another embodiment of the invention. The embodiment shown in FIG. 4 is substantially similar to the embodiment shown in FIG. 3. However, there are two buffer stages BS1 and BS2. Each of the buffer stages BS1 and BS2 includes four buffers B1 to B4. This configuration can be used in order reduce the number of output ports fTX at the second stage ST2 of the control stage CNTL. Instead of three times two output ports fTX1, fTX2 and fTX3 (as shown in FIG. 3 and FIG. 2) there is now only one fTX port and three enable ports EN1, EN2 and EN3. If one channel (series-resonant circuit) is enabled by anyone of the three enable signals, all the three MOSFET relays are turned off (disconnecting). The remaining enable signals for the inactive series-resonant circuits are in high impedance state. The respective driver transistors of the inactive switching stages are disconnecting due to the pull-up and pull-down resistors. This means that the inactive series-resonant circuits are in high impedance state. However, transistors T7, T8 and T9 may receive the same control signal at their control gates. In order to implement a wired-OR function, there are three further diodes D4, D5 and D6. Instead of these three diodes, a 3-input OR-gate can be used. Furthermore, transistors T1, T2, T3, T4, T5, T6, T7, T8 and T9 are now bipolar transistors. Accordingly, there are further resistors RW2, RW3, RW4, RW5, RW6, RW7, RW8, RW9 and RW10 for biasing the bipolar transistors T1 to T9 properly. Furthermore, there is a resistor RW1 between the outputs of buffers B1 and B2 of buffer stage BS1 and the control inputs of MOSFET relays MR1, MR2 and MR3. RW1 limits the current through the control diodes in MOSFET relays MR1 and MR3.

Figure 5:
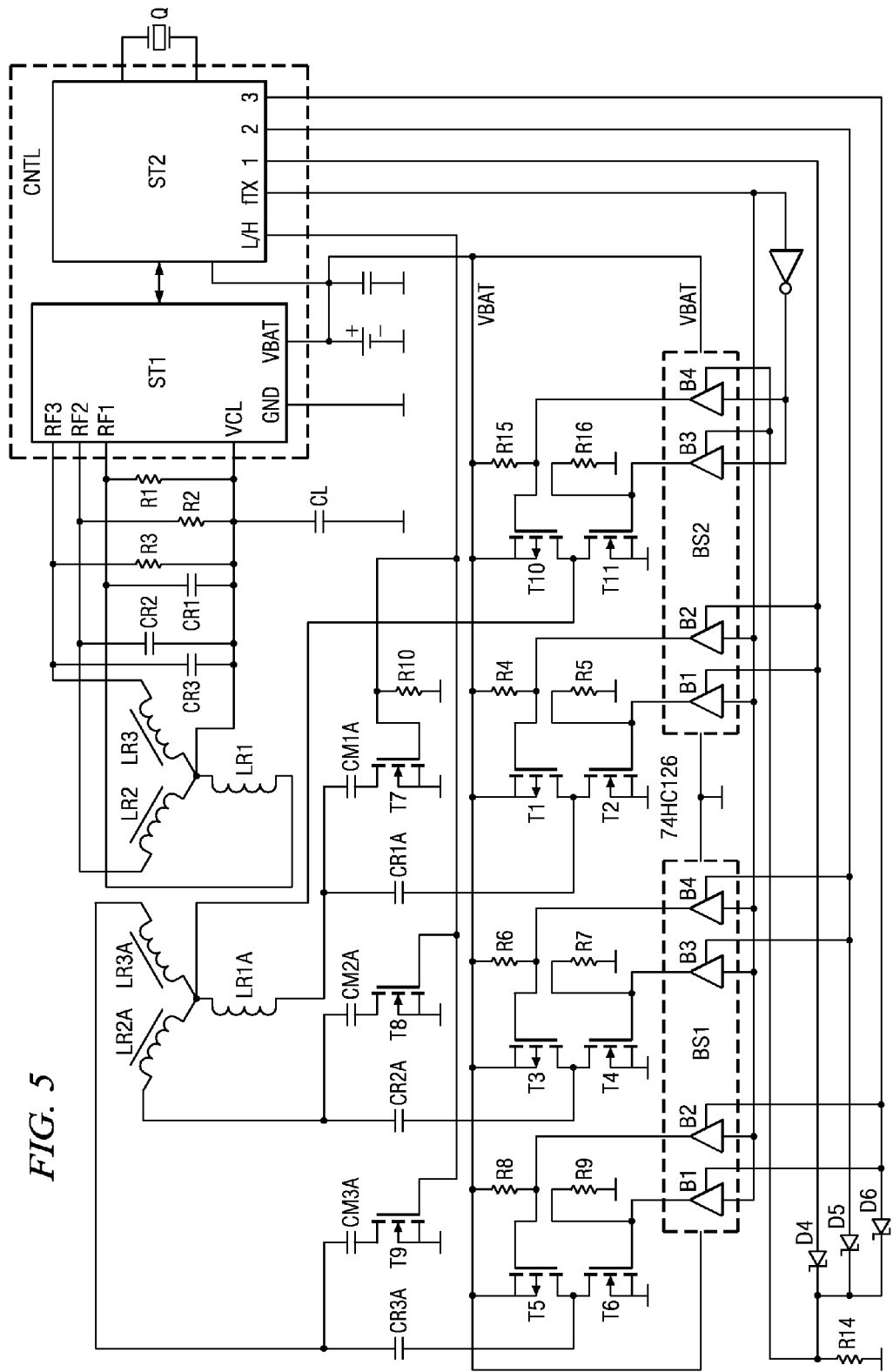
FIG. 5 shows a simplified circuit diagram of a fourth embodiment of the invention.

FIG. 5 shows a simplified circuit diagram of an embodiment that is substantially similar to the one shown in FIG. 2. There are two three-dimensional antennas. The three-dimensional antenna comprising LR1, LR2 and LR3 is used for receiving radio signals while the three-dimensional antenna comprising coils LR1A, LR2A and LR3A is used for transmitting signals. However, this embodiment uses the same buffer stages BS1 and BS2 for reducing the number of required output ports of the second stage ST2 of the control stage CNTL. Transistors T1 to T11 are now MOSFET transistors. In addition to the three switching stages comprising transistors T1, T2, T3, T4, T5 and T6, there is now a fourth switching stage comprising transistors T10 and T11. The switching stage is basically similar to the other switching stages. However, in this embodiment, the second sides of coils LR1A, LR2A and LR3A are also switched between VBAT and ground with a 180° phase shift. This increases the magnitude of the currents flowing through transmission coils LR1A, LR2A or LR3A and thereby the range of the transmitted radio signals.

Figure 6:
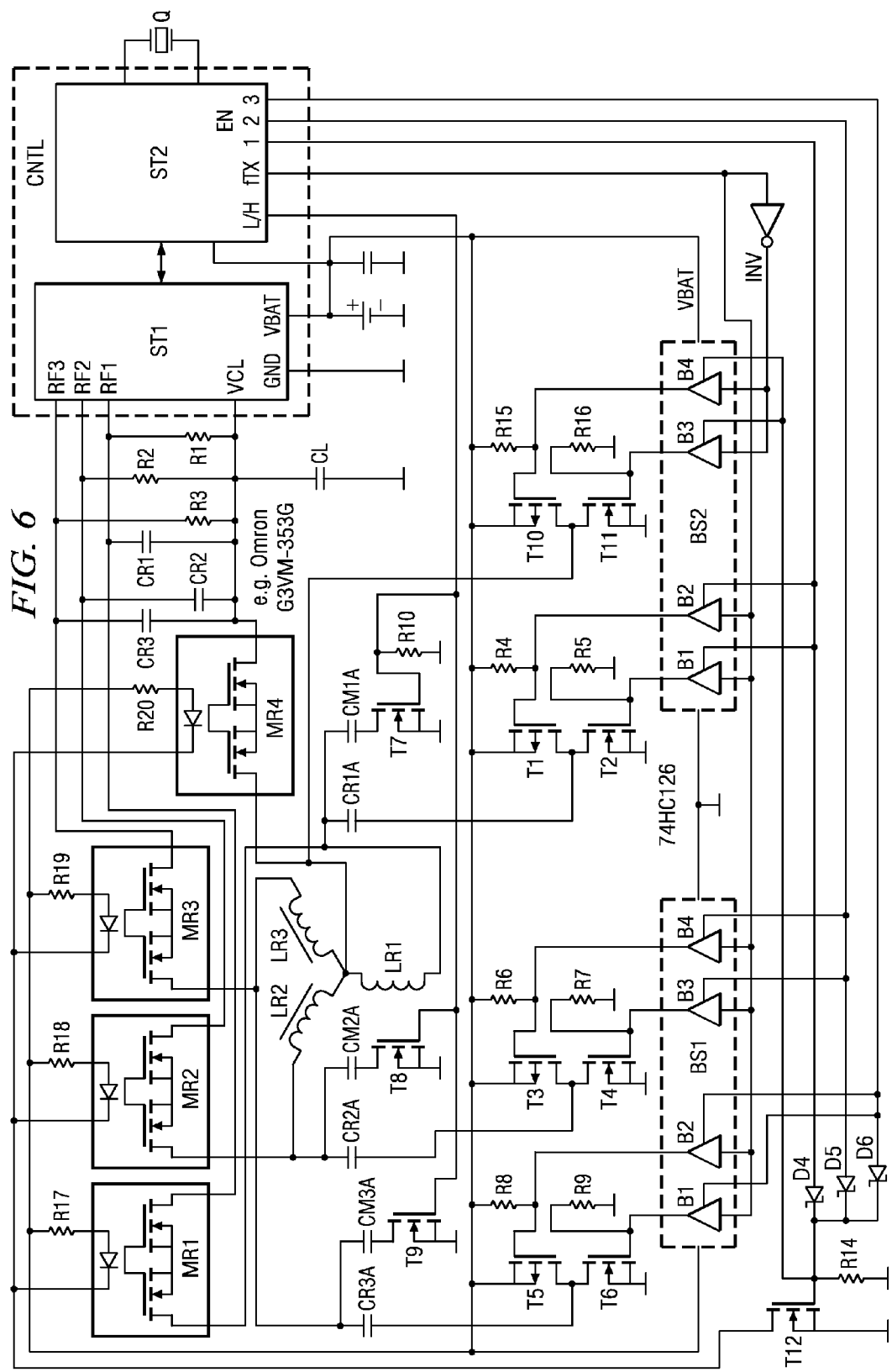
FIG. 6 shows a simplified circuit diagram of a fifth embodiment of the invention.

FIG. 6 shows a simplified circuit diagram of another embodiment of the invention. The embodiment shown in FIG. 6 is substantially similar to the one shown in FIG. 4. However, there is also a fourth switching stage comprising transistors T10 and T11 for switching the second sides of the coils LR1, LR2 and LR3 between VBAT and ground. Furthermore, there is a fourth MOSFET relay MR4 between the second sides of coils LR1, LR2 and LR3 and the second sides of capacitors CR1, CR2 and CR3. This relays serves to decouple the second sides of coils LR1, LR2 and LR3 from the common node VCL of the capacitors CR1, CR2 and CR3. The transistors T1 to T11 are again MOSFET transistors in this embodiment.

Figure 7:
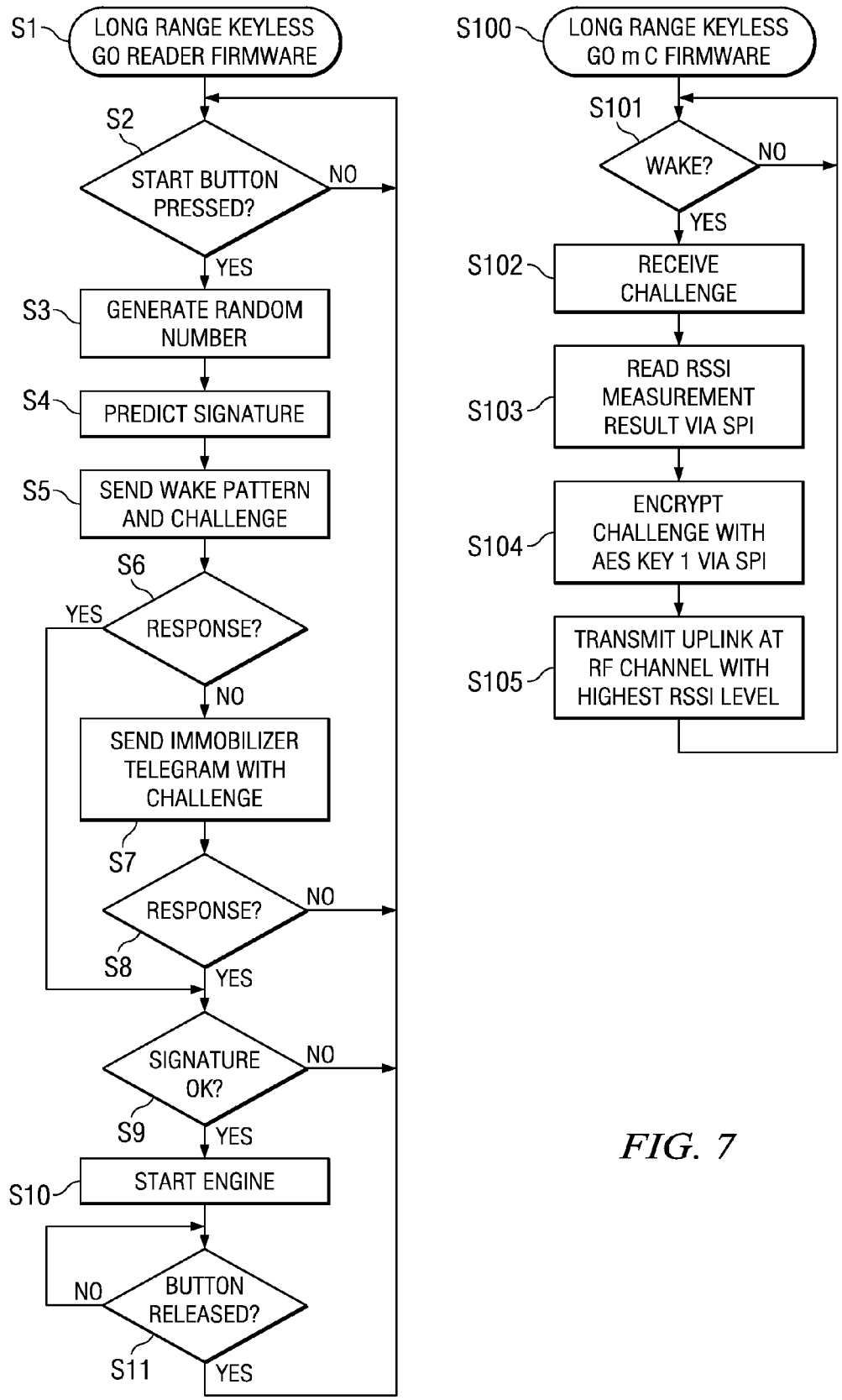
FIG. 7 shows a flow chart illustrating the operation of the system according to aspect of the invention.

FIG. 7 shows a flow chart illustrating the basic operation of an R/W-unit (also referred to as interrogator) and an electronic device, for example a transponder in a key, according to aspects of the invention. The left flow chart shown in FIG. 7 relates to the R/W-unit or interrogator. In step S1, the R/W-unit and the respective (long range keyless go reader) firmware is switched on. The R/W-unit waits until a start button is pressed in step S2. If the start button is pressed in step S2, a random number is generated in step S3. In step S4, a signature for the random number is predicted. In step S5, a wake burst, a wake pattern and challenge signal are sent to the electronic device (transponder or key). In step S6, the R/W-unit waits for an active, battery-driven response from the transponder. If a response is received, the R/W-unit continues with step S9 and performs a check of the signature. If the signature is correct, the engine of, for example a motorbike or a car, is ignited in step S10. If the start button is released in step S11, the procedure continues and waits in step S2 until the start button is pressed again. If however in step S6, the response from the transponder or electronic device is not received, the R/W-unit sends an immobilizer telegram with a challenge in step S7. If no response is received after sending the immobilizer telegram with challenge, the procedure returns to step S2 and waits until the start button is pressed again. However, if a response is received the signature is checked in step S9. If the signature is correct the engine can be started in step S10. However, if the signature is not correct, the procedure returns to step S2 and waits until the start button is pressed. The flow chart on the right hand side of FIG. 7 shows a corresponding procedure in the electronic device according to the invention and/or a corresponding transponder. In step S100 the (long range keyless go μC) firmware. In step S101 the transponder waits for a wake signal that is sent, for example in step S5 from the R/W-unit. If a wake pattern is received, the transponder waits in step S102 for a challenge signal. The field strength (RSSI) of the received radio signal is measured in step S103. In step S104, the challenge signal is encrypted with an encryption key. Furthermore, in step S105, the encrypted challenge is transmitted to the R/W-unit through the channel with the highest RSSI level. The second stage ST2 (e.g. a microcontroller) is not involved, if only an uplink telegram is sent by the front-end ST1. Therefore, a response is still possible, even if the battery is low or removed. However, the transmission distance is then only very short.

Figure 8:
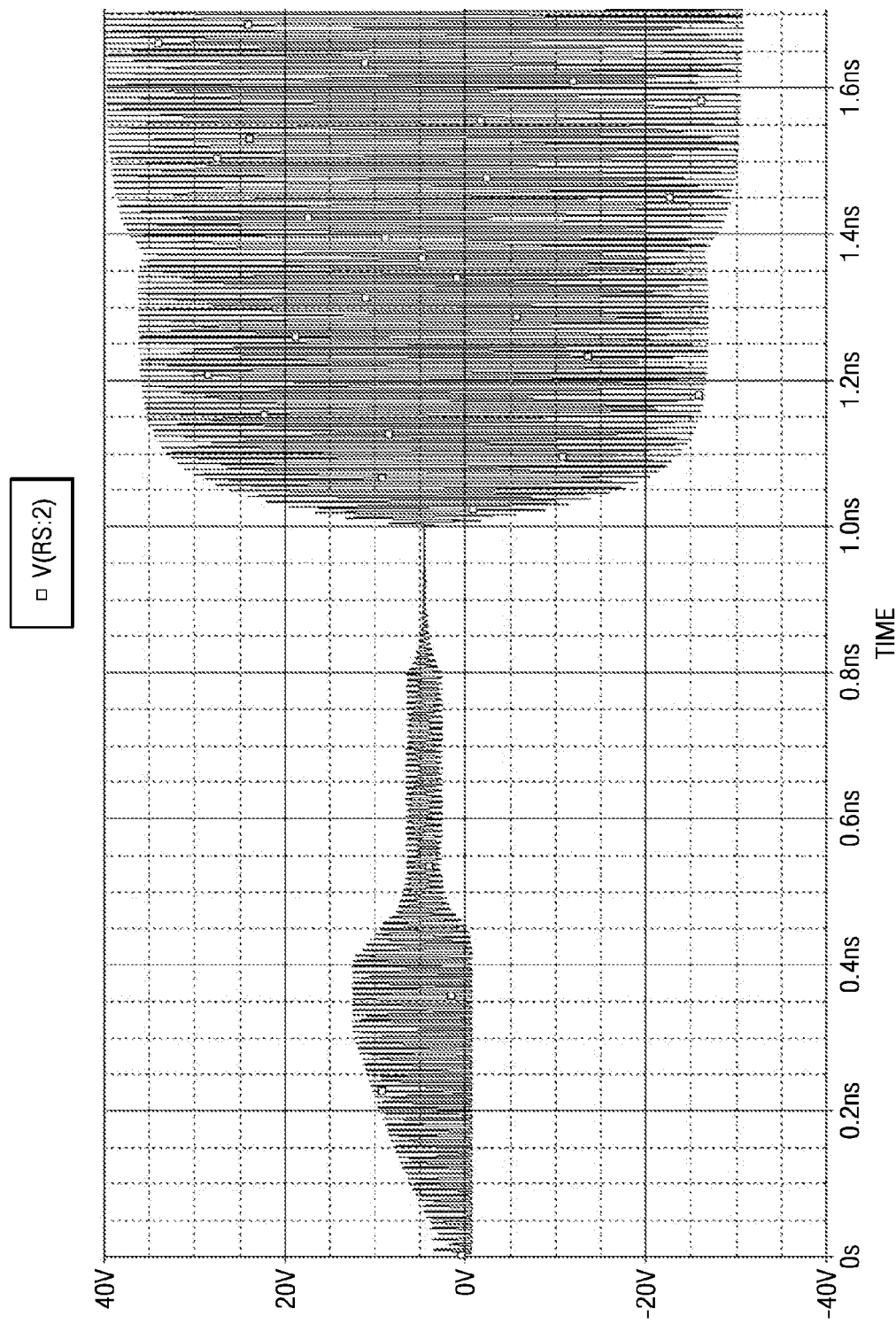
FIG. 8 shows a diagram illustrating the voltage drop across a coil used in parallel and series configuration.

FIG. 8 shows the radio frequency voltage of the coils LR1, LR2 or LR3, for example of the embodiment shown in FIG. 4. During the first 0.8 ms, the voltage levels of a passive immobilizer function are shown. The maximum amplitude is limited by the front-end ST1 to 12 V. The uplink amplitude is shown between 0.5 ms and 0.8 ms and is only 2.5 V. After 1 ms, the radio frequency voltage behavior of a low bit and high bit active transmission is shown. The uplink-amplitude is then substantially greater (about 40 V). This means that the uplink signals can be detected over a greater distance.

Although the invention has been described in detail, it should be understood that various changes, substitutions and alterations can be made thereto without departing from the spirit and scope of the invention as defined by the appended claims.

The invention claimed is:

1. An electronic device for half-duplex near field transmission of radio signals comprising:
    a first coil, a second coil and a third coil, being arranged as a three-dimensional antenna each of the coils operating independently of the other;
    a first capacitor, a second capacitor and a third capacitor coupleable in parallel to the first coil, the second coil and the third coil, respectively, for selectively forming a first, a second and a third parallel-resonant circuit for transmitting and receiving radio signals;
    first, second, third series-resonant circuits for transmitting near field radio signals formed by fourth, fifth and sixth capacitors in series with the first, second and third coils, respectively; and
    a control stage configured to either use one of the first, second or third parallel-resonant circuits for receiving radio signals and for charging a capacitor to power the electronic device and utilizing a corresponding one of the first, second, third series-resonant circuits for transmitting near field signals.

2. The electronic device according to claim 1, wherein the series-resonant circuit is configured to transmit radio signals in the same frequency range as the parallel-resonant circuits.

3. The electronic device according to claim 2, wherein each of the parallel-resonant circuits is configured to receive the radio signals at a first frequency, and the series-resonant circuit is configured to transmit the radio signals at the first frequency and a second frequency according to frequency shift keying.

4. The electronic device according to claim 1, wherein the fourth capacitor is coupled with a first side to a first side of the first coil for selectively forming the series-resonant circuit and for transmitting the radio signals through the first coil and the control stage is configured to switch from parallel resonance to serial resonance using either the first or the second frequency.

5. The electronic device according to claim 4, wherein the fifth capacitor is coupled with a first side to a first side of the second coil for selectively forming the series-resonant circuit and for transmitting the radio signals through the second coil and the control stage is configured to switch from parallel resonance to serial resonance using either the first or the second frequency.

6. The electronic device according to claim 5, wherein the sixth capacitor is coupled with a first side to a first side of the third coil for selectively forming the series-resonant circuit and for transmitting the radio signals through the third coil and the control stage is configured to switch from parallel resonance to serial resonance using either the first or the second frequency.

7. The electronic device according to claim 4, further comprising a seventh capacitor which is coupled with a first side to the first coil and with a second side to a first side of a switch that is coupled with a second side to ground for selectively changing the resonant frequency of the series-resonant circuit comprising the first coil and the fourth capacitor during transmission of the radio signals for frequency shift keying of the radio signal.

8. The electronic device according to claim 5, further comprising a seventh capacitor which is coupled with a first side to the first coil and with a second side to a first side of a switch that is coupled with a second side to ground for selectively changing the resonant frequency of the series-resonant circuit comprising the first coil and the fourth capacitor during transmission of the radio signals for frequency shift keying of the radio signal.

9. The electronic device according to claim 6, further comprising a seventh capacitor which is coupled with a first side to the first coil and with a second side to a first side of a switch that is coupled with a second side to ground for selectively changing the resonant frequency of the series-resonant circuit comprising the first coil and the fourth capacitor during transmission of the radio signals for frequency shift keying of the radio signal.

10. The electronic device according to claim 4, further comprising a first normally closed switch that is coupled between the first side of the first coil and a first side of the first capacitor so as to selectively decouple the first side of the first coil from the first side of the first capacitor.

11. The electronic device according to claim 5, further comprising a first normally closed switch that is coupled between the first side of the first coil and a first side of the first capacitor so as to selectively decouple the first side of the first coil from the first side of the first capacitor.

12. The electronic device according to claim 6, further comprising a first normally closed switch that is coupled between the first side of the first coil and a first side of the first capacitor so as to selectively decouple the first side of the first coil from the first side of the first capacitor.

13. The electronic device according to claim 7, further comprising a first normally closed switch that is coupled between the first side of the first coil and a first side of the first capacitor so as to selectively decouple the first side of the first coil from the first side of the first capacitor.

14. The electronic device according to claim 10, further comprising a second normally closed switch that is coupled between the first side of the second coil and a first side of the second capacitor so as to selectively decouple the first side second coil from the first side of the second capacitor.

15. The electronic device according to claim 14, further comprising a third normal-on switch that is coupled between the first side of the third coil and a first side of the third capacitor so as to selectively decouple the first side of the third coil from the first side of the third capacitor.

16. The electronic device according to claim 10, wherein the second sides of the first, second and third coil are coupled together and the second sides of the first, second and/or third capacitor are coupled together.

17. The electronic device according to claim 1, wherein the series-resonant circuit comprises a coil and a capacitor, and wherein the capacitor is coupled with a first side to a first side of the coil and with a second side to a switching stage that is configured to selectively couple the second side of the capacitor to a first supply voltage node having a first supply voltage level or a second supply voltage node having a second supply voltage level, in particular ground.

18. The electronic device according to claim 17, wherein the switching stage comprises a first transistor that is coupled with a first side of its channel to the second side of the capacitor and with a second side of its channel to the first supply voltage node and a second transistor that is coupled with a first side of its channel to the second side of the capacitor and with a second side of its channel to the second supply voltage node, so as to alternately and selectively switch the second side of the capacitor between the first supply voltage level and the second supply voltage level.

19. The electronic device according to claim 18, further comprising another capacitor that is coupled with a first side to the first side of the coil and with a second side to a switch for selectively coupling the second side of the capacitor to the second supply voltage level, in particular to ground.

20. A method for half-duplex transmission of radio signals comprising:
    receiving radio signals in one of a first, second, and third coil being arranged as a three-dimensional antenna in a parallel-resonant circuit for providing power to electronic circuit each of the coils operating independently of the other;
    selecting one of the first, second, third parallel-resonant circuits having greatest received signal strength indication (RSSI) for reception of radio signals;
    transmitting near field radio signals with a corresponding one of the first, second, third series-resonant circuits formed by fourth, fifth and sixth capacitors in series with the first, second and third coils, respectively;
    wherein each of the series-resonant circuits and parallel-resonant circuits are comprised in the same electronic device; and wherein transmitting of the radio signals is performed according to frequency shift keying; and
    switching between the parallel-resonant circuit and the series-resonant circuit.

* * * * *